(12) United States Patent
Renkis

(10) Patent No.: US 9,438,865 B2
(45) Date of Patent: *Sep. 6, 2016

(54) SYSTEMS AND METHODS FOR AUTOMATED CLOUD-BASED ANALYTICS FOR SECURITY SURVEILLANCE SYSTEMS WITH MOBILE INPUT CAPTURE DEVICES

(71) Applicant: Smartvue Corporation, Nashville, TN (US)

(72) Inventor: Martin A. Renkis, Nashville, TN (US)

(73) Assignee: SMARTVUE CORPORATION, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,480

(22) Filed: Sep. 4, 2015

(65) Prior Publication Data

US 2015/0381948 A1    Dec. 31, 2015

Related U.S. Application Data

(63) Continuation-in-part of application No. 14/249,687, filed on Apr. 10, 2014.

(51) Int. Cl.

| | | |
|---|---|---|
| H04N 7/18 | (2006.01) |
| H04N 13/02 | (2006.01) |
| G06T 19/00 | (2011.01) |
| G08B 13/196 | (2006.01) |
| G06K 9/00 | (2006.01) |
| H04L 29/08 | (2006.01) |

(52) U.S. Cl.
CPC .......... *H04N 7/181* (2013.01); *G06K 9/00771* (2013.01); *G06T 19/003* (2013.01); *G08B 13/19656* (2013.01); *H04L 67/10* (2013.01); *H04N 13/0275* (2013.01)

(58) Field of Classification Search
CPC ..................... G06K 9/00718; G06K 9/00771; G08B 13/19656; H04L 67/10; H04N 5/23206; H04N 5/23293; H04N 7/181; G06T 15/205; G06T 7/004
USPC .......................... 348/159, 47, 143; 709/219
See application file for complete search history.

(56) References Cited

U.S. PATENT DOCUMENTS

| | | |
|---|---|---|
| 6,842,674 B2 | 1/2005 | Solomon |
| 7,259,778 B2 | 8/2007 | Arpa et al. |
| 7,379,879 B1 | 5/2008 | Sloo |
| 7,675,520 B2 | 3/2010 | Gee et al. |
| 7,944,454 B2 | 5/2011 | Zhou et al. |
| 8,233,660 B2 | 7/2012 | Fritsch et al. |
| 8,284,254 B2 | 10/2012 | Romanowich et al. |
| 8,311,983 B2 | 11/2012 | Guzik |
| 8,532,820 B1 | 9/2013 | Sampath |
| 8,559,914 B2 | 10/2013 | Jones |
| 8,639,644 B1 | 1/2014 | Hickman et al. |

(Continued)

*Primary Examiner* — Sath V Perungavoor
*Assistant Examiner* — Nathnael Aynalem
(74) *Attorney, Agent, or Firm* — Triangle Patents, PLLC

(57) ABSTRACT

Systems and methods for cloud-based surveillance for a target surveillance area are disclosed. At least two input capture devices and at least one user device are communicatively connected to a cloud-based analytics platform. At least one input capture device is a mobile device with visual sensors. The cloud-based analytics platform automatically analyzes received 2-Dimensional (2D) video and/or image inputs for generating 3-Dimensional (3D) surveillance data and providing 3D display for a target surveillance area.

20 Claims, 7 Drawing Sheets

(56) References Cited

U.S. PATENT DOCUMENTS

| | | |
|---|---|---|
| 8,718,837 B2 | 5/2014 | Wang et al. |
| 8,721,197 B2 | 5/2014 | Miyahara et al. |
| 8,745,086 B2 | 6/2014 | Cardno et al. |
| 8,751,043 B2 | 6/2014 | Guo et al. |
| 8,811,697 B2 * | 8/2014 | Sofka .................... G06F 19/321 |
| | | 382/128 |
| 8,903,551 B2 | 12/2014 | El-Essawy et al. |
| 9,011,607 B2 | 4/2015 | De Luca et al. |
| 9,058,706 B2 | 6/2015 | Cheng |
| 2004/0030571 A1 | 2/2004 | Solomon |
| 2004/0143602 A1 | 7/2004 | Ruiz et al. |
| 2007/0159323 A1 | 7/2007 | Rockefeller et al. |
| 2009/0087161 A1 | 4/2009 | Roberts et al. |
| 2010/0274816 A1 | 10/2010 | Guzik |
| 2011/0018998 A1 | 1/2011 | Guzik |
| 2011/0034209 A1 * | 2/2011 | Rubinsky .............. G06F 19/321 |
| | | 455/556.1 |
| 2011/0256886 A1 | 10/2011 | Velusamy |
| 2011/0288684 A1 | 11/2011 | Farlow et al. |
| 2011/0316697 A1 | 12/2011 | Krahnstoever et al. |
| 2012/0113121 A1 | 5/2012 | Luo et al. |
| 2012/0114296 A1 | 5/2012 | Luo et al. |
| 2012/0146789 A1 | 6/2012 | De Luca et al. |
| 2012/0262576 A1 | 10/2012 | Sechrist et al. |
| 2012/0282884 A1 | 11/2012 | Sun |
| 2013/0027552 A1 | 1/2013 | Guzik |
| 2013/0030875 A1 | 1/2013 | Lee et al. |
| 2013/0039542 A1 | 2/2013 | Guzik |
| 2013/0085625 A1 | 4/2013 | Wolfe et al. |
| 2013/0141543 A1 | 6/2013 | Choi et al. |
| 2013/0166711 A1 | 6/2013 | Wang et al. |
| 2013/0188031 A1 | 7/2013 | Park et al. |
| 2013/0197718 A1 | 8/2013 | Lee et al. |
| 2013/0289858 A1 | 10/2013 | Mangiat et al. |
| 2013/0290234 A1 | 10/2013 | Harris et al. |
| 2014/0122702 A1 | 5/2014 | Jung et al. |
| 2014/0122720 A1 | 5/2014 | Jung et al. |
| 2014/0123325 A1 | 5/2014 | Jung et al. |
| 2014/0192159 A1 | 7/2014 | Chen et al. |
| 2014/0266669 A1 * | 9/2014 | Fadell .................. G05B 19/042 |
| | | 340/501 |
| 2014/0307076 A1 | 10/2014 | Deutsch |
| 2014/0310186 A1 | 10/2014 | Ricci |
| 2014/0333615 A1 | 11/2014 | Ramalingam et al. |
| 2014/0340510 A1 | 11/2014 | Ihlenburg et al. |
| 2014/0365273 A1 | 12/2014 | Hurewitz |
| 2015/0022664 A1 | 1/2015 | Pflug et al. |
| 2015/0127191 A1 | 5/2015 | Misra et al. |
| 2015/0221193 A1 * | 8/2015 | Pragada ................ G06F 21/554 |
| | | 348/153 |
| 2015/0248503 A1 * | 9/2015 | Glunz .................... G06F 17/50 |
| | | 703/1 |

* cited by examiner

SYSTEMS AND METHODS FOR AUTOMATED CLOUD-BASED ANALYTICS FOR SECURITY SURVEILLANCE SYSTEMS WITH MOBILE INPUT CAPTURE DEVICES

CROSS-REFERENCES TO RELATED APPLICATIONS

This application claims priority from a co-pending US application; it is a continuation-in-part of U.S. patent application Ser. No. 14/249,687 filed Apr. 10, 2014, which is incorporated herein by reference in its entirety.

BACKGROUND OF THE INVENTION

1. Field of the Invention

The present invention relates to cloud-based systems and methods for automated analytics of inputs from remote, distributed devices for security surveillance.

2. Description of the Prior Art

It is known in the prior art to use mobile devices for security surveillance, as well as to analyze image and video content for surveillance purposes. While the prior art discloses individual aspects as the present invention, very few, if any, teach the ability to authenticate and analyze captured inputs from un-registered user-devices. The present invention permits remote servers to accept captured inputs from a variety of mobile devices, authenticate metadata from the inputs, and analyze the inputs to provide surveillance information.

The proliferation of wireless, mobile devices having image and video functions is widespread and use of these device-functions continues to increase. Sporting events, social gatherings, dissident events, and emergency situations are typically captured on a multitude of devices operated by differing users. Nowhere in the prior art is provided social surveillance or security system that allows for uploading of these captured inputs, authentication of such inputs, and cloud-based analysis of the inputs in order to provide real- or near real-time surveillance of a target environment. Prior art documents teach that camera and video input devices may be equipped with a time-stamp function that embeds a date and time into an image or video for later authentication. Also, it is known in the prior art to provide authentication of users and/or devices through the evaluation of uploaded content, including stenographic techniques such as digital fingerprinting and watermarking, or user-verification techniques such as login or CAPTCHA technologies and biometric scanning.

Notably, most of the prior art security surveillance systems disclose the use of fixed devices, rather than the use of mobile devices. For example, content-based analytics is widely used in CCTV settings and when verifying that digital content has been unaltered or authenticating a content's source (e.g., copyrighted music, images and videos). Additionally, similar technology has been deployed in military and law enforcement units, although these technologies typically require specialized pre-registered devices, as opposed to incorporating distributed, unknown devices.

It is known in the prior art that a video surveillance system can be set up at a location with a local recorder and server besides cameras. In recent years, with development of cloud computing and communication technologies, there is a need for users to have access to their surveillance systems anywhere anytime with their smart mobile devices. Meanwhile, users need not only basic recording from their surveillance systems, but also want to get more advanced preventive and proactive analytics from their surveillance systems.

Video surveillance systems typically rely on 2-Dimensional (2D) images and/or videos. If high-definition 3D images and/or videos can be generated for surveillance, the security surveillance system could harvest much better information. Camera manufactures have developed 3D cameras in order to produce 3D videos. However, the prices are much higher than those of regular 2-Dimensional (2D) cameras. For the existing surveillance systems with 2D cameras, it is a huge expense to update to 3D cameras in order to get 3D surveillance.

Thus there is a need for a cloud-based analytics platform, which not only provides users access anyway anytime via a network-connected device, but also generating 3D images and/or videos based on regular 2D input data from cameras, especially from mobile devices, and providing 3D analytics.

By way of example, prior art documents include:

U.S. Pat. No. 7,259,778 for "Method and apparatus for placing sensors using 3D models" by inventor Aydin Arpa et al. filed Feb. 13, 2004, describes method and apparatus for dynamically placing sensors in a 3D model is provided. Specifically, in one embodiment, the method selects a 3D model and a sensor for placement into the 3D model. The method renders the sensor and the 3D model in accordance with sensor parameters associated with the sensor and parameters desired by a user. In addition, the method determines whether an occlusion to the sensor is present.

U.S. Pat. No. 7,675,520 for "System, method and computer program for creating two dimensional (2D) or three dimensional (3D) computer animation from video" by inventor Will Gee et al. filed Dec. 7, 2006, describes System, method and computer program for creating two dimensional (2D) or three dimensional (3D) computer animation from video. In an exemplary embodiment of the present invention a system, method and computer program product for creating at least a two dimensional or three dimensional (3D) datastream from a video with moving objects is disclosed. In an exemplary embodiment of the present invention, a method of creating animated objects in 2D or 3D from video, may include: receiving video information which may include a plurality of frames of digital video; receiving and adding metadata to the video information, the metadata relating to at least one object in motion in the digital video; and interpreting the metadata and the video information and generating a datastream in at least 2D. In an exemplary embodiment, 2D, 3D or more dimensional data may be used to provide an animation of the event of which the video was made. In an exemplary embodiment, a 2D or 3D gametracker, or play reviewer may be provided allowing animation of motion events captured in the video.

U.S. Pat. No. 7,944,454 for "System and method for user monitoring interface of 3-D video streams from multiple cameras" by inventor Hanning Zhou, et al. filed Sep. 7, 2005, describes a user navigation interface that allows a user to monitor/navigate video streams captured from multiple cameras. It integrates video streams from multiple cameras with the semantic layout into a 3-D immersive environment and renders the video streams in multiple displays on a user navigation interface. It conveys the spatial distribution of the cameras as well as their fields of view and allows a user to navigate freely or switch among preset views. This description is not intended to be a complete description of, or limit the scope of, the invention. Other features, aspects, and objects of the invention can be obtained from a review of the specification, the figures, and the claims.

U.S. Pat. No. 8,284,254 for "Methods and apparatus for a wide area coordinated surveillance system" by John Frederick Romanowich, et al. filed Aug. 11, 2005, describes a coordinated surveillance system. The coordinated surveillance system uses a larger number of fixed low resolution detection smart camera devices and a smaller number of pan/tilt/zoom controllable high resolution tracking smart camera devices. The set of detection cameras provide overall continuous coverage of the surveillance region, while the tracking cameras provide localized high resolution on demand. Each monitor camera device performs initial detection and determines approximate GPS location of a moving target in its field of view. A control system coordinates detection and tracking camera operation. A selected tracking camera is controlled to focus in on, confirm detection, and track a target. Based on a verified detection, a guard station is alerted and compressed camera video is forwarded to the guard station from the camera(s). The guard station can direct a patrol guard to the target using GPS coordinates and a site map.

U.S. Pat. No. 8,721,197 for "Image device, surveillance camera, and mask method of camera screen" by inventor Hiroyuki Miyahara, et al. filed Aug. 10, 2012, describes a microcomputer. In a microcomputer included in an image device, a mask 2D 3D converting section expresses coordinates of a 2-dimensional image plane defined by an imaging element having a rectangular contour in a 3-dimensional coordinate system. The image plane is positioned in the state that a focal length corresponding to a zoom position is adopted as a Z coordinate value of the image plane in the 3-dimensional coordinate system. A mask display position calculating section 165 calculates a 2-dimensional position of a mask on a camera screen by utilizing a similarity of the size of the image plane and the size of the camera screen when a position of a mask on the image plane in the 3-dimensional coordinate system after PAN, TILT rotations and a zooming is converted into the 2-dimensional position of the mask on the camera screen.

U.S. Publication 2013/0141543 for "Intelligent image surveillance system using network camera and method therefor" by inventor Sung Hoon Choi, et al. filed May 23, 2012, describes an intelligent control system. The intelligent control system according to an exemplary embodiment of the present disclosure includes a plurality of network cameras to photograph a surveillance area; an image gate unit to perform image processing of image data, which is input from the plurality of network cameras, according to a specification that is requested by a user; a smart image providing unit to convert a plurality of image streams, which are image processed by the image gate unit, to a single image stream; and an image display unit to generate a three-dimensional (3D) image by segmenting, into a plurality of images, the single image stream that is input from the smart image providing unit and by disposing the segmented images on corresponding positions on a 3D modeling.

U.S. Publication 2014/0192159 for "Camera registration and video integration in 3d geometry model" by inventor Henry Chen, et al. filed Jun. 14, 2011, describes apparatus, systems, and methods to receive a real image or real images of a coverage area of a surveillance camera. Building Information Model (BIM) data associated with the coverage area may be received. A virtual image may be generated using the BIM data. The virtual image may include at least one three-dimensional (3-D) graphics that substantially corresponds to the real image. The virtual image may be mapped with the real image. Then, the surveillance camera may be registered in a BIM coordination system using an outcome of the mapping.

U.S. Publication 2014/0333615 for "Method For Reconstructing 3D Scenes From 2D Images" by inventor Srikumar Ramalingam, et al. filed May 11, 2013, describes a method reconstructing at three-dimensional (3D) real-world scene from a single two-dimensional (2D) image by identifying junctions satisfying geometric constraint of the scene based on intersecting lines, vanishing points, and vanishing lines that are orthogonal to each other. Possible layouts of the scene are generated by sampling the 2D image according to the junctions. Then, an energy function is maximized to select an optimal layout from the possible layouts. The energy function use's a conditional random field (CRF) model to evaluate the possible layouts.

U.S. Pat. No. 8,559,914 for "Interactive personal surveillance and security (IPSS) system" by inventor Jones filed Jan. 16, 2009, describes an interactive personal surveillance and security (IPSS) system for users carrying wireless communication devices. The system allows users carrying these devices to automatically capture surveillance information, have the information sent to one or more automated and remotely located surveillance (RLS) systems, and establish interactivity for the verification of determining secure or dangerous environments, encounters, logging events, or other encounters or observations. This IPSS is describes to enhance security and surveillance by determining a user's activities, including (a.) the user travel method (car, bus, motorcycle, bike, snow skiing, skate boarding, etc.); (b.) the user motion (walking, running, climbing, falling, standing, lying down, etc.); and (c.) the user location and the time of day or time allowance of an activity. When user submits uploaded (or directly sent) surveillance information to the public server, the surveillance videos, images and/or audio includes at least one or more of these searchable areas, location, address, date and time, event name or category, and/or name describing video.

U.S. Pat. No. 8,311,983 for "Correlated media for distributed sources" by inventor Guzik filed Dec. 14, 2009 (related to U.S. Publications 2010/0274816, 2011/0018998, 2013/0027552 and 2013/0039542) discloses method embodiments associating an identifier along with correlating metadata such as date/timestamp and location. The identifier may then be used to associate data assets that are related to a particular incident. The identifier may be used as a group identifier on a web service or equivalent to promote sharing of related data assets. Additional metadata may be provided along with commentary and annotations. The data assets may be further edited and post processed. Correlation can be based on multiple metadata values. For example, multiple still photos might be stored not only with date/time stamp metadata, but also with location metadata, possibly from a global positioning satellite (GPS) stamp. A software tool that collects all stored still photos taken within a window of time, for example during a security or police response to a crime incident, and close to the scene of a crime, may combine the photos of the incident into a sequence of pictures with which for investigation purposes. Here the correlation is both by time and location, and the presentation is a non-composite simultaneous display of different data assets. Correlating metadata can be based on a set of custom fields. For example, a set of video clips may be tagged with an incident name. Consider three field police officers each in a different city and in a different time zone, recording videos and taking pictures at exactly at midnight on New Year's Day 2013. As a default, a group may be identified to include all users with data files with the same Event ID. A group may also be either a predefined or a self-selecting group, for example a set belonging to a security agency, or a set of all police officers belonging to the homicide division, or even a set of officers seeking to share data regardless of if they are bellowing to an organized or unorganized group.

U.S. Pat. No. 7,379,879 for "Incident reporting system and method" by inventor Sloo filed Feb. 26, 1999, describes a computer-based method of collecting and processing incident reports received from witnesses who observe incidents such as criminal acts and legal violations. The method automates the collection and processing of the incident reports and automatically sends the incident reports to the appropriate authority so that the observed incidents can be acted on in an appropriate manner. For example, a witness may be equipped with a video input system such as a personal surveillance camera and a display. When the witness encounters an incident such as a suspect committing a crime, the video input system would automatically recognize the suspect from the video input and could then display records for the suspect on the witness's hand held readout without revealing the suspect's identity. The witness would not need to know the identity of the suspect to observe the incident relating to the suspect. Such a system may overcome some of the problems associated with publicly revealing personal data.

U.S. Publication 2009/0087161 for "Synthesizing a presentation of a multimedia event" by inventors Roberts, et al. filed Sep. 26, 2008, discloses a media synchronization system includes a media ingestion module to access a plurality of media clips received from a plurality of client devices, a media analysis module to determine a temporal relation between a first media clip from the plurality of media clips and a second media clip from the plurality of media clips, and a content creation module to align the first media clip and the second media clip based on the temporal relation, and to combine the first media clip and the second media clip to generate the presentation. Each user who submits content may be assigned an identity (ID). Users may upload their movie clips to an ID assignment server, attaching metadata to the clips as they upload them, or later as desired. This metadata may, for example, include the following: Event Name, Subject, Location, Date, Timestamp, Camera ID, and Settings. In some example embodiments, additional processing may be applied as well (e.g., by the recognition server and/or the content analysis sub-module). Examples of such additional processing may include, but are not limited to, the following: Face, instrument, or other image or sound recognition; Image analysis for bulk features like brightness, contrast, color histogram, motion level, edge level, sharpness, etc.; Measurement of (and possible compensation for) camera motion and shake.

U.S. Publication 2012/0282884 for "System and method for the emergency voice and image e-mail transmitter device" by inventor Sun filed May 5, 2011, describes a voice and image e-mail transmitter device with an external camera attachment that is designed for emergency and surveillance purposes is disclosed. The device converts voice signals and photo images into digital format, which are transmitted to the nearest voice-image message receiving station from where the digital signal strings are parsed and converted into voice, image, or video message files which are attached to an e-mail and delivered to user pre-defined destination e-mail addresses and a 911 rescue team. The e-mail also includes the caller's voice and personal information, photo images of a security threat, device serial number, and a GPS location map of the caller's location. When the PSU device is initially used, the user needs to pre-register personal information and whenever a digital signal string is transmitted out from the PSU device it will include these personal information data plus a time code of the message being sent, the PSU device's unique serial number, and the GPS generated location code, etc. which will all be imbedded in the PSU e-mail.

U.S. Publication 2012/0262576 for "Method and system for a network of multiple live video sources" by inventors Sechrist, et al. filed Mar. 15, 2012, discloses a system and a method that operate a network of multiple live video sources. In one embodiment, the system includes (i) a device server for communicating with one or more of the video sources each providing a video stream; (ii) an application server to allow controlled access of the network by qualified web clients; and (iii) a streaming server which, under direction of the application server, routes the video streams from the one or more video sources to the qualified web clients.

Geo-location information and contemporaneous timestamps may be embedded in the video stream together with a signature of the encoder, providing a mechanism for self-authentication of the video stream. A signature that is difficult to falsify (e.g., digitally signed using an identification code embedded in the hardware of the encoder) provides assurance of the trustworthiness of the geo-location information and timestamps, thereby establishing reliable time and space records for the recorded events. In general, data included in the database may be roughly classified into three categories: (i) automatically collected data; (ii) curated data; and (iii) derivative data. Automatically collected data includes, for example, such data as reading from environmental sensors and system operating parameters, which are collected as a matter of course automatically. Curated data are data that are collected from examination of the automatically collected data or from other sources and include, for example, content-based categorization of the video streams. For example, detection of a significant amount of motion at speeds typical of automobiles may suggest that the content is "traffic." Derivative data includes any data resulting from analysis of the automatically collected data, the curated data, or any combination of such data. For example, the database may maintain a ranking of video source based on viewership or a surge in viewership over recent time period. Derivative data may be generated automatically or upon demand.

None of the prior art provides solutions for cloud-based 3D analytics for a target surveillance area as provided by the present invention.

SUMMARY OF THE INVENTION

The present invention relates to virtualized computing or cloud-computing network with input capture devices (ICDs) and user devices and a cloud-based analytics platform for automatically analyzing received video, audio and/or image inputs, generating 3-Dimensional visual data for providing social security and/or surveillance for a surveillance environment, surveillance event, and/or surveillance target.

The present invention is directed to systems and methods for cloud-based surveillance for a target surveillance area. The cloud-based surveillance system comprises at least two ICDs, one cloud-based analytics platform having a processor and a memory, and at least one user device having a display with a user interface. The cloud-based platform is constructed and configured in network-based communication with the at least two ICDs and the at least one user device. Each of the at least two ICDs has at least one visual sensor and is operable to capture and transmit input data to the cloud-based analytics platform, and at least one of the at least two ICDs is a mobile device with a visual sensor. The cloud-based analytics platform is operable to receive and authenticate the input data from the at least two ICDs, generate 3-Dimensional (3D) visual representation based on input data captured from the at least two ICDs and perform advanced analytics based on the input data and/or the generated 3D visual representation for the target surveillance area. The at least one user device is operable to display the 3D visual representation of the target surveillance area via the user interface of the user device.

These and other aspects of the present invention will become apparent to those skilled in the art after a reading of the following description of the preferred embodiment when considered with the drawings, as they support the claimed invention.

DETAILED DESCRIPTION

Figure 1:
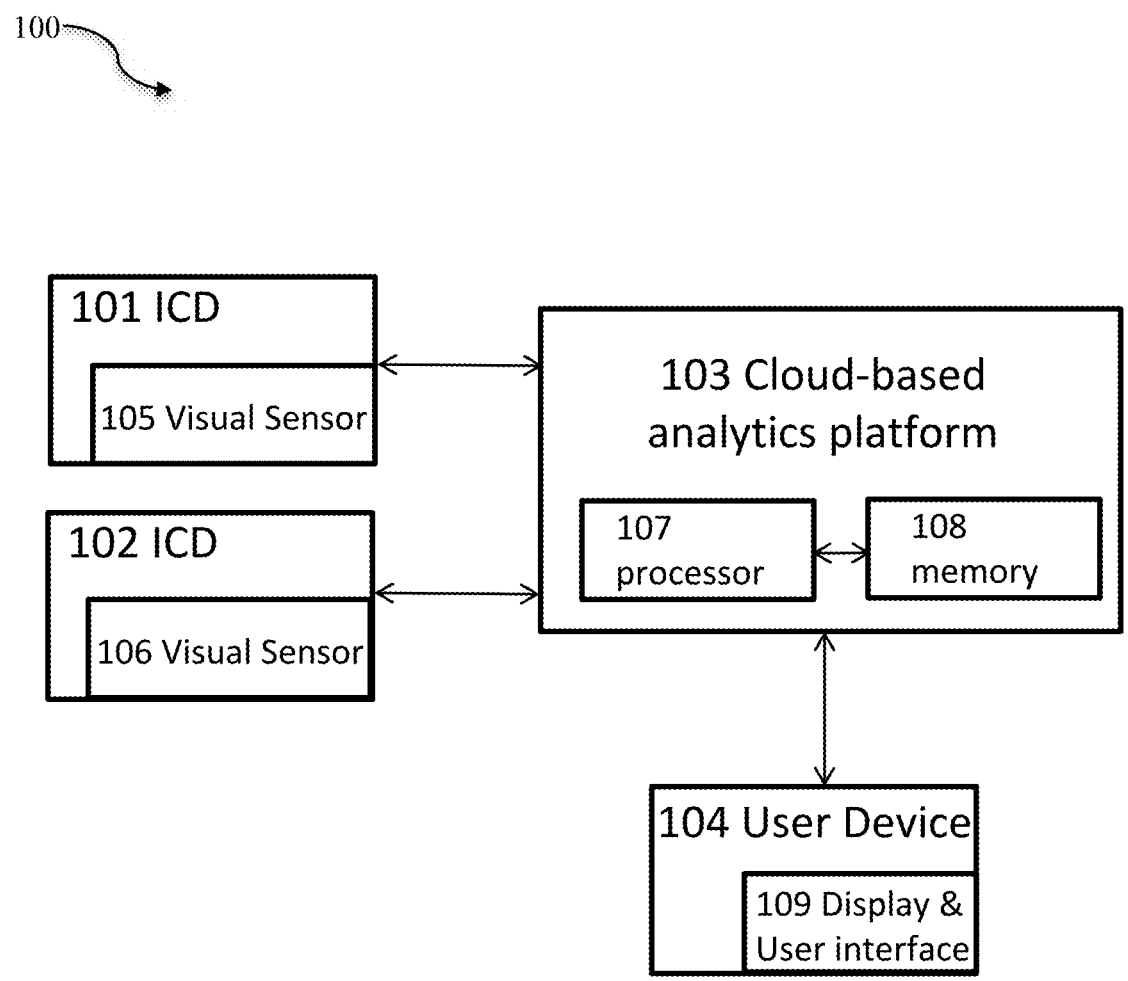
FIG. 1 is a block diagram of an exemplary system consistent with the invention.

Referring now to the drawings in general, the illustrations are for the purpose of describing a preferred embodiment of the invention and are not intended to limit the invention thereto.

The present invention relates to cloud-based surveillance systems and methods for providing at least one server computer in communication with a network for providing centralized and/or distributed cloud-based analytics of inputs captured from remote input capture devices for providing analyzed inputs that are stored in the cloud-based system database and accessible remotely and securely for providing security for at least one surveillance environment, surveillance event, and/or surveillance target. Related secure wired and/or wireless networks and systems, and methods for using them are disclosed in U.S. Publications 2006/0064477 and 2014/0071289, and U.S. Pat. Nos. 7,784,080, 7,719,567, 7,954,129, 7,728,871, 7,730,534 and 8,395,664, each of which are incorporated herein by reference in their entirety. The present invention also relates to generating 3D surveillance data based on 2D visual input for providing more accurate 3D analytics. Related 3D visualization systems and methods are disclosed in U.S. Pat. No. 8,395,664, which is incorporated herein by reference in its entirety.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

Although "cloud computing" can generically be applied to any software as a service or to services interfacing through the Internet, in the present invention, "cloud-based" computing refers to distributed computing among at least one server or more than one server.

The present invention is directed to systems and methods for cloud-based surveillance for a target surveillance area. The cloud-based surveillance system comprises at least two ICDs, one cloud-based analytics platform having a processor and a memory, and at least one user device having a display with a user interface. The cloud-based platform is constructed and configured in network-based communication with the at least two ICDs and the at least one user device. Each of the at least two ICDs has at least one visual sensor and is operable to capture and transmit input data to the cloud-based analytics platform, and at least one of the at least two ICDs is a mobile device with a visual sensor. The cloud-based analytics platform is operable to receive and authenticate the input data from the at least two ICDs, generate 3-Dimensional (3D) visual representation based on input data captured from the at least two ICDs and perform advanced analytics based on the input data and/or the generated 3D visual representation for the target surveillance area. The at least one user device is operable to display the 3D visual representation of the target surveillance area via the user interface of the user device.

The at least two ICDs may communicate with each other and form a mesh network. In one embodiment, ICDs communicate with each other to 1) extend the range of the ICDs, so they transmit data to pass down the line to the receiver, extending the range by the number of cameras and 2) cameras communicate with each other based on set rules and decide themselves when an issue should be made aware of to the cloud-based analytics platform. By way of example, one camera can alert another camera if it picks up a fast moving person who is running towards that camera; if a person should not be at that camera, it can then alert the cloud platform.

Alternatively, ICDs can communicate with each other to exchange data that each ICD receives and then, based on rules that each camera has, act on that data. By way of example, if an ICD detects a person who has an RFID tag, the ICD can also detect that person's RFID data and compare it to a database to determine if that person has permission to be at a certain location. Furthermore, the system also can track a person's movement. If a person appears with the incorrect RFID tag or no RFID tag, then an alarm can be sent to other ICDs and/or the cloud-based analytics platform which can in turn communicate with other ICDs.

Input Capture Device(s) (ICDs)

The ICDs in the present invention include at least one visual sensor, be it a video camera or image camera. By way of example, the ICDs may be security cameras, smart phones, tablets, wearable input capture devices and other devices with visual sensors.

On the front end of the system, each of the at least two ICDs further includes a power source, a power converter; soft power down component which provides for a gentle power down so that ICD settings are preserved and not lost. Preferably each ICD is wireless. And preferably, while the ICD is wireless, it further includes an optional network connection at a back side of the ICD also, so it can be hardwired into a network.

The ICDs may also include at least one input component for detecting and recording inputs, a processor, a memory, a transmitter/receiver, and optionally, at least indicator light for indicating camera activities, all constructed and configured in electronic connection. By way of example and not limitation, the at least one input component may include a microphone, and/or a camera. In one preferred embodiment of the present invention, the at least one wireless ICD includes two antennas for providing a wireless signal for receiving and/or transmitting data with the cloud-based analytics platform or another ICD(s). The ICDs are operable for cross-communication with each other, including data exchange, wherein the data exchange includes information about the surveillance environment, settings, inputs, and combinations thereof. The at least two ICDs further includes a housing having a removable casing around the lens to make lens adjustments or settings; ICD adjustments and settings are preferably optional, and are not usually required in preferred embodiments of the present invention, as the cloud-based analytics platform automatically establishes and controls the ICD settings and activities for each of the at least two ICDs associated with the target surveillance area.

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range within the surveillance environment and compressing the captured video into a data stream, the capture occurring at predetermined dates and times, during activity detection, and/or on command from the cloud-based analytics platform. In the case of video, the images are adjustable to capture at different sizes, different frame rates, and/or to include the display of the name of the device (determined by the user and/or the system), the date, the time, and combinations thereof. The ICD including a DVC is capable of capturing images that are combinable and/or integratable with the video data stream and/or compressible into an individual image data stream, all at predetermined dates and times, when activity such as motion or audio are detected, on command from the wireless DVR, and combinations thereof. As with video capture, image capture is adjustable to capture at different sizes, different frame rates, and/or to include the display of the name of the device (determined by the user and/or the system), the date, the time, and combinations thereof. A data stream of images is transmittable wirelessly to the cloud-based analytics platform.

Similarly, where the ICDs have audio capabilities, the captured audio, which is combinable and/or integratable with other inputs captured by the ICD sensors, is compressible into an individual audio data stream, which is transmittable wirelessly to the cloud-based analytics platform. The activity of audio ICD is activatable at predetermined dates and times, during activity detection, and/or on command from the cloud-based analytics platform. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least two ICDs are capable of capturing video, which is compressible into a data stream, and transmittable wirelessly to the cloud-based analytics platform, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video, and audio capture. In a preferred embodiment, at least two sensor types are used, audio and image or video sensors. The at least one indicator is included with the ICD to indicate that the power is "on", and to indicate that motion and/or audio being detected. The indicator is activatable when motion and/or audio is detected in a predetermined area and/or in a predetermined amount within the environment.

In one embodiment, the at least two ICDs are capable of capturing and transmitting 3-Dimensional (3D) visual data to the cloud-based analytics platform for 3D surveillance analytics. In another embodiment, the at least two ICDs are just capable of capturing and transmitting regular 2-Dimensional (2D) visual data. In such situation, the at least two ICDs are positioned to capture visual data for one location from different angles. Then, the cloud-based analytics platform is operable to generate 3D data for analytics based on the captured 2D visual data from the at least two ICDs.

Each of the at least two ICDs is constructed for configuration that is capable of wireless communication (2-way) with the cloud-based analytics platform and/or any other ICD(s), which when configured provide a surveillance system for a target surveillance area. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from a controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The ICD also includes a sensor with ability for high dynamic range for inputs.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors, and preferably greater. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no adjustments to camera settings, such as focus and focal length, are required after camera installation; ICD settings are preadjusted and further controllable remotely by the cloud-based analytics platform and/or other ICD(s). Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antenna that are removable, including standard antennae, which may be substituted for a patch antenna and/or a long range antenna.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have video analytics display to show ICD status on a front side of the ICD itself, on a small screen. Information orientation is preferably adjustable or automatically adaptable, based upon device orientation, so that a user can easily review the information or text in a proper orientation (i.e., vertically). In an alternate embodiment, this camera status and information may be viewable on a remote screen that is in wireless communication with the device(s), for example on a handheld electronic device such as a mobile phone or PDA.

Additionally, the ICDs have the ability to communicate with one another to exchange data about the environment and all control settings and other settings of any other ICDs.

ICDs may be removed from operation and/or operational communication or interaction with the system. To remove an ICD from the surveillance system, a user click-selects via a user interface on an image and/or name that represents the capture device they want removed and then click-selects a single removal button. The cloud-based analytics platform then removes that ICD from the surveillance system.

ICDs may have local storage and analytic functions. ICDs and/or cameras which have the ability to capture video and audio and/or 3D data about an area of interest and/or data from sensors then analyze the video and/or the 3D data and/or the sensor data to determine among other things how many people are in an area of interest, how much time they spent in an area, what direction they traveled, how tall they are, exactly where they are in a 3 dimensional space, their gestures and physical behavior (to determine and predict human behavior and intentions), RFID data, bar code data, and any other sensor data such as temperature and humidity data as well as analyze the video and/or the 3D data and/or the sensor data to determine if there are objects in the area which are new or are different (were removed from the area or moved into the area) such as boxes, cars, equipment, and object RFID or other data such as Bar Code data. Then upon analyzing that data, the camera can optionally make decisions on that data based on rules that are stored in a database in the camera.

These rules in the ICD(s) or smart camera(s) are provided from the cloud-based analytics platform and/or another smart camera and are operable to be changed automatically at any time or upon demand by an authorized user of the system.

Smart Mesh Camera Networking with Video Content Management

In one embodiment of the present invention, the system includes a smart mesh ICD networking with a video content management. The smart mesh ICD network of the system is operable to provide ICDs to communicate with the cloud-based analytics platform and/or other ICDs to act as repeaters, i.e., an extension or repeat functional component, to extend the usable range of the system beyond the range of any individual ICD.

In another embodiment of the present invention, in particular wherein the system has video capabilities, the system includes ICDs that are operable to communicate with each other and/or the cloud-based analytics platform to exchange data and/or control each other to ensure that important data from ICD inputs is transmitted to cloud-based analytics platform properly. By way of example, a first ICD senses the motion of a person moving towards a second ICD and communicates instruction or directive to the second ICD to be aware of the motion sensed by the first ICD and to take appropriate action as programmed or set-up for that ICD, such as to record the sensed motion. The appropriate action may further include capturing and/or recording the inputs at an increased frame rate, an increased resolution, and/or other action to ensure that the important data, in this case motion, is captured or recorded by the second ICD.

In another embodiment of the present invention, in particular wherein the system has video capabilities, the system includes ICDs that are operable to communicate directly with each other and/or the cloud-based analytics platform to exchange data and/or control each other based on a set of rules created by the user. By way of example, a first ICD detects a first motion of a first object that is moving towards a second ICD; wherein the first ICD has been programmed and/or set-up with a rule indicating that if motion moves from the first ICD to a second ICD, then an alarm must be made. The first or second camera can send the alarm to the cloud-based analytics platform as the ICDs can share rules with each other.

In another embodiment of the present invention, in particular wherein the system has video capabilities, the system includes ICDs that are operable to directly cross-communicate with each other and/or the cloud-based analytics platform to exchange data and/or control each other to ensure maximum throughput at the appropriate ICDs. By way of example, a first ICD detects a first motion of a first object that is moving towards a second ICD; wherein the first ICD has been programmed and/or set-up to send a status signal to the second ICD to ensure that the second ICD has the throughput it requires to monitor the pending action.

In another embodiment of the present invention, in particular wherein the system has video capabilities, the system includes ICDs that are operable to communicate with each other and/or the cloud-based analytics platform to exchange data. Such data includes "content data" that is a separate stream of data from the video data. The ICDs work together to become a content management network whereby the content data is managed. By way of example, in a room monitored by an ICD, a person wearing a red sweater places a box on the floor, opens a door, and leaves. The ICD could detect the following: (1) a moving mass that is the color red, the person's sweater; (2) a movement in an otherwise steady mass, the door; and (3) a new mass now in the image, the box. In addition to the video of the event, the ICD could store the content data of "a person wearing red left a box in the room and walked out the door." This content data can be shared with the cloud-based analytics platform and/or other ICDs.

In another embodiment of the present invention, in particular wherein the system has video capabilities, the system includes ICDs that are operable to communicate with each other and/or the cloud-based analytics platform to exchange data and/or control each other based on a set of rules created by the user. Such data includes "content data" that is a separate stream of data from the video data. The ICDs work together to become a content management network whereby the content data is managed. By way of example, in a room monitored by an ICD, a person wearing a red sweater places a box on the floor, opens a door, and leaves. The ICD could detect the following: (1) a moving mass that is the color red, the person's sweater; (2) a movement in an otherwise steady mass, the door; and (3) a new mass now in the image, the box. In addition to the video of the event, the ICD could store the content data of "a person wearing red left a box in the room and walked out the door." This content data can be shared with the cloud-based analytics platform and/or other ICDs. The content data may trigger a rule, which could be set to issue an alarm if a mass is left in the room, such as the box in the current example. The rule could further include capturing and/or recording the ICD's inputs at an increased frame rate, an increased resolution, and/or other action to ensure that the important data, in this case the video of the new box, is captured or recorded by the ICD.

In another embodiment of the present invention, the at least one ICD includes at least one video capture device or the ICD(s) have digital video input capture capability and components functional for providing the same; and digital video recording (DVR) capabilities and components functional for providing the same. Furthermore, the ICD(s) may be video camera(s) or provide such function similar to video camera(s).

Additionally, microchip(s) within the ICD(s) provide intelligent input capture and learned pattern analysis, such as an ICD with video capability identifying or sensing a mass of an object within its surveillance range, comparing the input characteristics with referenced and/or learned information, labeling the sensed object based on a likely match in the referenced and/or learned information, communicating and/or referencing programmed data to determine if other action is required, and performing the required action, as appropriate. By way of example, a wireless digital camera senses a moving object within its target surveillance area, compares the size and shape of the object with reference information to determine that the moving object is likely a person, checks rules or settings to determine whether sensing the presence of a person is a trigger event for indicating an alarm, and communicating the alarm and/or recording and transmitting the images associated with the moving object (person) to other ICD(s) and/or the cloud-based analytics platform. In another example, additional inputs such as RFID inputs from tagged objects, identification badges, and the like, may be inputted to the ICD(s) and compared with reference information or settings to activate (or not) a trigger event. Alternatively, the absence of an RFID transmitter on a moving object (person) or stationary object (unauthorized package or object) in a secure area including the target surveillance environment may also be operable to activate a trigger event or alarm, and/or activate other sensors, such as radiation, sound, chemical detection, and the like, and combinations thereof. By way of more detailed example, in the case of video surveillance, where a person enters the target environment under surveillance by the ICDs, and where the person has an employee badge with an RFID or other transmitting capability, either active or passive, embedded or incorporated therein/on, the ICDs video capture identifies the RFID tag data and compares it with existing data or settings stored within the ICD(s). If the RFID tag data does not comport with permissions available for and associated with that ID tag, then the ICD(s) activates a trigger event, such as recording inputs including video, audio, and other data associated with the person detected by the ICD, such as, by way of example and not limitation, clothing color, direction of travel, mass, height, speed, whether the person is carrying anything, movement particulars like jerkiness or injury, and the like. The ICD(s) then cross-communicate to ensure that other ICDs are aware of the non-compliant detection by the first ICD so that they respond accordingly. If the trigger event is an alarm event, then the ICDs are operable to send notification directly to the cloud-based analytics platform or through other ICDs to the cloud-based analytics platform, such that corresponding alarm event actions occur, such as further third party notification and inputs recording as required or determined by settings or programming within the system. In preferred embodiments the ICDs are digital video cameras operable to communicate wirelessly with each other and the cloud-based analytics platform.

In another embodiment according to the present invention, the ICDs within the mesh network are further equipped with wireless communication transmitters, such as cellular phone transmitters or wide band cellular cards for providing cellular transmission/reception by each ICD, to provide each ICD/camera with standalone capability to cross-communicate with each other to extend the effective surveillance area and/or to communicate with each other to transmit and receive information that is further transmitted via the Internet to the cloud-based analytics platform. Furthermore, business models using such systems and components with this type of method of operation permit users to access the system and its inputs for monitoring after payment of a monthly service fee. If an authorized user has paid the monthly subscription charge or service fee, then the user may remotely access ICD inputs, including stored data, and can download the stored or recorded input data through the cloud-based analytics platform and/or a device in electronic communication with the cloud-based analytics platform.

Cloud-Based Analytics Platform

The present invention provides a cloud-computing surveillance system including: at least one server computer having a processor and a memory, constructed and configured in network-based communication with a multiplicity of remote input devices having input capture mechanisms; inputs captured by the remote input devices transmitted within a secure messaging communicated over the network; wherein the inputs are received, authenticated, and indexed by the at least one server computer and stored in a corresponding database; wherein the inputs are processed and analyzed based upon at least one profile for a surveillance environment, a surveillance event, and/or a surveillance target, for providing a near-real-time analysis of the inputs to determine a status of security. The at least one profile associated with the surveillance environment, surveillance event, and/or surveillance target may include security level (low, medium, high), alert level, time interval for review for change, authorized remote input device and/or user information, and combinations thereof. The status may be selected from: normal, questionable, alert, urgent, disaster, injury, and any descriptor or indicator of the level and condition of the environment, event, and/or target compared with predetermined conditions.

The system may further include a priority and a profile associated with the inputs for automatically associating the inputs with the corresponding surveillance environment, surveillance event, and/or surveillance target. The profile associated with the inputs may include user and/or owner identifier, equipment identifier, communication security level, and combinations thereof. In one embodiment, the secure messaging includes internet protocol (IP) messaging of data packet(s) including the inputs, and may further include encryption, digital fingerprinting, watermarking, media hashes, and combinations thereof. As described in the following detailed description of the invention, the inputs are selected from images, audio, and/or video; more particularly, the input is selected from live streaming video, real-time images and/or audio, previously recorded video, previously captured images and/or audio, and combinations thereof. The remote input devices include mobile phones, smart phones, tablet computers, portable computers, mobile communication devices, wearable input capture devices, and/or security cameras. By way of example and not limitation, a wearable input capture device may be removable, portable devices such as eyewear (like Google Glass), headwear, wristwear, etc.

The analysis is performed by a virtualized or cloud-based computing system and provides for remote access of analyzed inputs, and involves at least one rules engine for transforming individual inputs into analyzed content. The analyzed content may include inputs from more than one remote input device. Additionally, the analyzed content may be generated by transforming the original inputs by the at least one server computer automatically assembling input fragments into an integrated content file, and wherein the original input is stored and associated with the integrated content file.

In one embodiment of the present invention, the authentication includes confirmation of global positioning system (GPS) location of each of the remote input devices providing inputs and matching the GPS location with corresponding at least one predetermined surveillance environment, surveillance event, and/or surveillance target. Preferably, the analysis includes authentication of the input device with a device identification, a user identification, a geographic location, and a time associated with the input and the predetermined surveillance environment, surveillance event, and/or surveillance target.

At the at least one server computer, the authenticated inputs are automatically tagged, combined, grouped, edited, and analyzed by the cloud-based system according to the predetermined surveillance environment, surveillance event, and/or surveillance target. Also, the input is verified by authenticating the at least one input device and/or its corresponding user and the input is analyzed to confirm that there has been no alteration, editing, and/or modification to the input prior to its receipt by the at least one server computer.

The present invention also provides methods for the system described in the foregoing, including the steps of: providing a cloud-based or virtualized computing system having at least one server computer with a processor and a memory, constructed and configured in network-based communication with a multiplicity of remote input devices having input capture mechanisms; receiving by the at least one server computer inputs from the remote input devices transmitted within a secure messaging communicated over the network; authenticating the inputs; indexing the inputs by the at least one server computer; and storing the inputs in a corresponding database; processing and analyzing the inputs by the at least one server computer using at least one profile for a surveillance environment, a surveillance event, and/or a surveillance target, for providing a near-real-time analysis of the inputs to determine a status of security. Additional steps may include: providing a priority for the secure messaging; analyzing inputs from more than one remote input device in near real time to provide social security surveillance of the surveillance environment, surveillance event, and/or surveillance target; and/or automatically assembling input fragments into an integrated content file, and wherein the original input is stored and associated with the integrated content file. Also, preferably, the authenticating step includes automatic authentication of the input device and/or its user based upon the combination of a device identification, a user identification, a geographic location, and a time associated with the input and the predetermined surveillance environment, surveillance event, and/or surveillance target.

The present invention systems and methods include a social surveillance system for providing automated cloud-based analytics that allows for uploading of captured inputs, authentication of the inputs, and analysis of the inputs to provide real-time or near real-time surveillance of a surveillance environment, surveillance event, and/or surveillance target. The social surveillance invention includes a combination of several key features including input authentication, time, and automated cloud-based analytics relating to the inputs and the surveillance environment, surveillance event, and/or surveillance target.

The authentication is provided with device and/or user with location wherein the input devices provide information including geographic location information and/or global positioning system (GPS) information to be embedded within images and videos and/or included in the messaging from the input devices over the network to the at least one server computer. Additionally, overlay and other techniques may also be used during upload of content, such as, by way of example and not limitation, TDOA, AIA, and RF fingerprinting technologies.

Preferably, the input devices are equipped with a timestamp function that embeds a date and time into an image or video for later authentication, or their messaging provides a date and time associated with the inputs, including images, and/or video.

Additionally, the authentication of users and/or devices through the evaluation of uploaded content, including stenographic techniques such as digital fingerprinting and watermarking, or user-verification techniques such as login or CAPTCHA technologies and biometric scanning.

While some content is considered verified by authenticating a user or device, additional analytics may be performed by the cloud-based system to establish that content has not been modified from its original sources, such as through the use of media hashes. Additionally, after receiving and authenticating multiple sources of information, analytics may allow for the inputs to be aggregated, tagged, combined, edited, and/or grouped. Although in the prior art, content-based analytics is used in CCTV settings and when verifying that digital content has been unaltered or authenticating a content's source (e.g., copyrighted music, images and videos), it has not been used for distributed, cloud-based social surveillance allowing for a multiplicity of inputs from remote input devices to at least one server computer for analysis of the inputs based upon a predetermined surveillance environment, surveillance event, and/or surveillance target, and more particularly for security surveillance.

Notably, the present invention does not require specialized pre-registered devices, but instead incorporates distributed, and potentially unknown devices, so long as the user, time and location correspond to the predetermined surveillance environment, surveillance event, and/or surveillance target.

Systems and methods of the present invention provide for a multiplicity of remote input devices, by way of example and not limitation, including commercially available devices such as Google glass or glasses or headwear having input capture mechanisms and mobile communication capability, mobile smart phones, cellular phones, tablet computers, gaming devices such as an Xbox Kinect controller, so long as the input device is constructed and configured to capture and share or transmit video and/or images associated with location data, direction, etc. and owners/users with the cloud-based surveillance system. The input information is stored on at least one server computer, in a centralized and/or virtualized central manner, and the input information is indexed, organized, stored, and available for access by authorized users via the network through a website or portal or API. The input device is preferably registered with the system through an app or software application associated with the remote or distributed input devices. While preregistration is not required for the inputs to be associated with at least one surveillance environment, surveillance event, and/or surveillance target, all inputs are required to be authenticated by the system based upon the input device, the input device user, and/or corresponding identification and/or association with the surveillance environment, surveillance event, and/or surveillance target. By way of example and not limitation, a video input is transmitted by a remote input device with an email including the video input as a media attachment within the message; the cloud-based system and its at least one server computer receives the email message, authenticates the email address associated with the device and/or user, and accepts the video. Also the same is provided with MMS or text messaging with video and/or audio and/or image.

In one embodiment of the present invention, method steps include: providing the system as described hereinabove; providing a software application operating on a remote input device for capturing at least one input including an image, a video, and/or an audio input; activating the software application; capturing the at least one input including an image, a video, and/or an audio input; automatically and/or manually including structural and/or descriptive metadata, including but not limited to unique identifying indicia associated with the input, time, location or geographic information, text and/or audio notation associated with the input, priority flag or indicator, and combinations thereof.

Optionally, the software application and/or the remote input device automatically verifies and authenticates the user of the remote input device, for example using biometric authentication such as facial recognition, fingerprint, etc., and/or using a user identification and passcode or personal identification number, or other authentication mechanisms. Preferably, the authentication information is included with the metadata corresponding to the input(s) and associated therewith as a composite input, and the software application and/or the remote input device automatically transmits the composite input over the network to the cloud-based system and the at least one server computer thereon and is saved in at least one database. In preferred embodiments of the present invention, a user interface is provided on the remote input device(s) or distributed computer device(s) and their corresponding displays to provide secure, authorized access to the composite input and/or to all inputs associated with predetermined surveillance environment, surveillance event, and/or surveillance target stored in the cloud database.

Also, preferably, the software application on the remote input device provides an automated sharing feature that provides for single click select and activation of media sharing of the selected inputs captured. In one embodiment, the single click select and activation of media sharing of the selected inputs captured on that remote input device provides for automatic association of the shared media with at least one email address corresponding to the user and the remote input device.

3D Analytics

The cloud-based analytics platform for a surveillance system may provide storage for input data from various ICDs and perform surveillance analytics based on the input data.

The present invention provides advanced image processing and 3D visual data generation. The cloud-based analytics platform calibrates at least two conventional 2D cameras so as to determine depth information. The at least two calibrated cameras take two 2D images for one location from different angles, advanced image processing on the cloud-based analytics platform finds matches between these two images, and the position of matched elements are triangulated to obtain missing depth information from these two 2D images. A 3D image for that one location can be constructed with the depth information. Similarly, a 3D video can be constructed based on 2D input data for streaming and analytics. Generated 3D images and videos can be rotated to review from different angles.

Thus, the present invention provides robust, real-time or near-real-time and easy-to-use surveillance analytics. Compared to 2D analytics, 3D analytics can reduce false alarms, improve the immersive effect for a physical security presence, and provide more accurate advanced analytics functions, such as facial recognition, object tracking, people counting, market analysis, etc.

The present 3D analytics provides cross-video surveillance and multiple target tracking Each movement trajectory of a tracking target may be highlighted differently. An alert may be generated when a target stays in a zone beyond a preset period of time, when a target passes a predefined line, or when a target satisfies any other preset rule for triggering an alert. The present 3D cloud-based analytics transforms passive analytics to reactive and preventive.

Visual Representation and Display

A surveillance system for wireless communication between components including: a base system including at least two wireless input capture devices (ICDs) and a cloud-based analytics platform and a user device having a display with a user interface, the cloud-based analytics platform being operable to transmit and receive information with the ICDs, the ICDs having at least one visual sensor and at least one input component for detecting and recording inputs, a microprocessor, a memory, a transmitter/receiver, all ICD components being constructed and configured in electronic connection; wherein the ICDs are operable for wireless cross-communication with each other independent of the cloud-based analytics platform for forming a mesh network of ICDs operable to provide secure surveillance of a target environment.

In one embodiment, the user interface provides a visual representation of captured data in an image format and a contextualized image format comprising the visual representation of captured data and coordinated spatial representation of the image format.

Preferably, the coordinated spatial representation of the image format includes a coordinate system to provide a spatial context for the captured data, which includes narrow-scope context that is related spatially to the immediate surroundings, and/or a geospatial context for the captured data, including more global or broad scope context that is related by GPS or other geographic-based coordinate systems. Thus, the present invention provides a 3-dimensional (3-D) geospatial view of the captured data.

In one embodiment, the coordinate system is an overlay for the visual representation of the captured data. In this case, the coordinate system provides context without visually depleting or diminishing the information provided by the two-dimensional or image-based captured data and its representation on the user interface.

In another embodiment, the coordinate system creates a 3-dimensional view of the 2-dimensional (2-D) image by providing relational spatial imaging of the surrounding environment or context of the image. Preferably, the 2-D image is visually represented as more linearly than the image itself, with the target or key aspects of the captured data and/or image being substantially represented in the same manner as in the 2-D image view. The target captured data may be the sensed image or object by the ICD(s), depending upon the sensors and related functionality. By way of example, the target image may be a person whose presence is detected by motion sensors on the ICD. In any case, the 2-D image may be an image itself, such as a digital photographic image, a still frame of a video image, a rendering of the actual image and/or data captured by the ICD(s), and combinations thereof.

In a preferred embodiment, the system is operable to provide comparable 2-D and 3-D images as set forth in the foregoing.

The present invention provides for systems and methods having a 3D model of a space provides a 3D context for the inputs from the ICDs; inputs from the ICDs, including direct cross-communication information, location, settings, environment conditions, and inputs (video, audio, temperature, other sensors, object patterns, movement of a multiplicity of objects and/or people, and analytics related to the objects and/or human patterns, including visual patterns, predetermined movements or gestures, facial recognition, and combinations thereof), being visually represented on a GUI independently and in the 3D context for simultaneous display of all the info, and analytics based on the info, including activity density within the 3D context based on the inputs, for surveillance and analysis of target environment(s).

The present invention provides for custom analytics that are relevant to the environment as in the present invention. By way of example, in a retail application, it's not about just tracking an individual who might be shoplifting or tampering with goods but the relevance is based on predetermined events or situations, like build-up of customers at specific 3D locations (like lines at check-out, lines at customer service, the deli counter, special advertisement or presentation of articles in different location to judge traffic/marketing/presentation, the emergency exit, etc.) wherein specific indications (analytics) would result (indication of need to open another register, notify additional customer service reps., more deli people, success of a promotional event/packaging change, etc.). This is an "activity density" or "content density" feature and functionality unique to the present invention. Furthermore, other behavior of humans, including but not limited to gestures, actions, changes in actions, patterns of behavior, facial recognition, age, sex, physical characteristics, and combinations thereof, are preferably included with the 3-D visual representation of the inputs and the analysis relating thereto. More preferably, the analysis and indication of predetermined patterns, activities, movements, speed, etc. are included simultaneously with the video inputs and their 3-D contextualization to provide for situational awareness and analysis automatically based upon the inputs and context thereof.

One aspect of the present invention is to provide systems and methods for analytics displays and management for information generated from video surveillance systems, including contextualization and remote review.

Another aspect of the present invention is to provide systems and methods for analytics displays and management for information generated from direct cross-communication from independent input capture devices (ICDs), wherein the information includes contextualization and remote review of inputs from the ICDs, the inputs being directly associated with the ICD(s) that originated them, and settings associated with each of the ICDs and information associated with the ICD settings (date, time, environment conditions, etc.) and the inputs (direct correlation).

Another aspect includes the addition of interactive 3D visualization remotely through a network on a remote computer having a display and a graphic user interface (GUI) viewable by a remote user. Preferably this remote user GUI provides a true 3D interface for simultaneously presenting input information and additional ICD-based information (including but not limited to ICD identification, position, settings, environment conditions, etc.) and an interactive 3D perspective of the ICD and its 3D physical context, thereby providing at least three levels of analytics and visual input information for multi-level processing of the surveillance environment.

A smart mesh network surveillance system and method for providing communication between a base system having at least one wireless input capture device ICD(s) and other ICD(s), wherein the ICD(s) are capable of smart cross-communication with each other and remote access to their inputs via a server computer, including the steps of providing this base system; at least one user accessing the ICDs and inputs remotely via a user interface through a remote server computer and/or electronic device communicating with it, wherein the captured data is represented visually on a user interface or screen views for the user, the screen views showing 2-dimensional data and corresponding 3-dimensional data of the same input capture with coordinate overlay to provide a geographic context for the captured data. The present invention uses the aforementioned systems and methods for providing a 3D model of a space provides a 3D context for the inputs from the ICDs; inputs from the ICDs, including direct cross-communication information, location, settings, environment conditions, and inputs and analysis thereof, being visually represented on a GUI independently and in the 3D context for simultaneous display of all the info, and analytics based on the info, including activity density within the 3D context based on the inputs, for surveillance and analysis of target environment(s).

Advantageously, this provides for action or response based on the 3D contextualized inputs and the various views, including but not limited to 3D geospatial overlay and interactivity to shift perspective within that 3D context.

Video contextualization is selective adopted by the user, preferably through a remote, network-based access. That visualization is functional and operable to be manipulated by a user to provide a visual perspective that optimizes data and information review, without eliminating data content provided by the input from the digital video surveillance system. By way of example and not limitation, the interactive GUI includes analytics about the target environment, based upon visual patterns. In one demonstrative case, this may include visual patterns that are automatically detected in a predetermined environment, such as a retail space. In this setting, automatic notification of a pattern, such as a grouping of a multiplicity of moving objects, like people queuing at a check-out counter, triggers automatic notification that a corresponding action should be taken, such as opening another check-out line to eliminate the queue quickly. In another example, marketing analytics may be obtained by visual patterns in a 3-D environment, such as traffic around a display in a retail setting; changing display configuration and positioning and the corresponding change in visual pattern detectable automatically in that environment can be compared using the systems and methods of the present invention.

3D Display

A user can access to the cloud-based analytics platform via a user interface via a user device with a display. The cloud-based analytics platform has a cloud account associated with a specific surveillance system. The user may receive alerts and/or messages via an authorized user device, such as smart phones, tablets, personal computers, laptops, head-mounted displays (HMD), and other display devices.

The cloud-based analytics platform provides 2D and/or 3D video streaming and storage for the surveillance system. A 3D video for a surveillance target area, either generated from 2D visual input data or received from 3D cameras, can be viewed via the user interface on a user device with a display. The 3D video is streaming in real time or near real time. In one embodiment, there is one video for each of the multiple surveillance locations in a surveillance target area, and one overall video for the whole surveillance target area.

Highlighted trajectory and contextualized features may be displayed with the 3D video. In one embodiment, the 3D video may be interactive. For example, one target object may be viewed from different angles by rotating the 3D surveillance video with a touch screen or a display with control buttons. A user may zoom in the 3D video for closer look, or zoom out the 3D video for a bigger picture.

In one embodiment, the display on a user's device may be conventional 2D display, then a user may need to wear 3D glasses for 3D view. In another embodiment, the display on a user's device may be operable to have glasses-free 3D display. In another embodiment, the user device is a head-mounted display, for example Oculus Rift, for virtual reality display.

3D Playback

The cloud-based analytics platform also provides 3D playback for a surveillance target area. 3D playback provides for users to see what happened in a certain period of time in the past. A certain period of video may be saved automatically on the platform, for example surveillance videos for the past 7 days. To obtain video storage and playback for more than a certain period of time, a user may set the settings on the platform and a certain fee may be charged.

3D playback provides another chance to identify any other suspicious objects and/or phenomena the users may have omitted, or find useful information between targeted objects, or any other information for an authorized user may be interested in later.

Communications

The ICDs transmits video and/or audio and other input data and optionally the decisions with input data wirelessly (using network protocols such as 802.11, cell phone protocols such as CDMA or GSM, or any other wireless protocol such as Zigbee, Bluetooth, or internet protocol, or other) to a local network device (e.g., a cell tower or a router) and then to the cloud-based analytics platform via internet.

The camera can optionally transmit the data and the decisions and/or the video and audio associated with that data wirelessly using network protocols such as 802.11, cell phone protocols such as CDMA or GSM, or any other wireless protocol such as Zigbee, Bluetooth, or other) to another camera which can take that data and combine it with its own data to make unique decisions based on the combination of the two data sets. Then the camera can send the combined data sets and optionally the decisions and/or video associated with that data wirelessly or wired to another camera to make further unique decisions on combined data.

Mobile ICDs in Cloud-Based Surveillance Systems

When at least one of the ICDs in a cloud-based surveillance system for a target surveillance area is a mobile ICD, the cloud-based analytics platform needs to authenticate input data from the mobile ICDs. By way of example, mobile ICs are mobile phones, smart phones, tablet computers, portable computers, mobile communication devices, wearable input capture devices, and/or security cameras. By way of example and not limitation, a wearable input capture device may be removable, portable devices such as eyewear (like Google Glass), headwear, wristwear, etc.

The mobile ICDs may be pre-registered or not registered with the cloud-based analytics platform for the target surveillance area. Either way, the mobile ICDs may transmit the input data to the cloud-based analytics platform in a secure message, for example, IP message, text message, email, etc. The cloud-based analytics platform will confirm the time as to when the input data is captured by the mobile ICDs. In one embodiment, the ICDs not matter mobile or not, are equipped with a time-stamp function that embeds a date and time into an image or video for later authentication, or their messages to the cloud-based analytics platform provide a date and time associated with the input data. The cloud-based analytics platform will also confirm the global positioning system (GPS) location of each of the remote input devices providing inputs and match the GPS location with that of the target surveillance area. In one embodiment, the ICDs, not matter mobile or not, are equipped with a locating function that embed GPS information into images/videos for later authentication, or their messages to the cloud-based analytics platform provide location information associated with the input data. For example, the text messages or emails provides location information with the input data. The cloud-based analytics platform will also confirm there has been no alteration, editing, or modification to the input data prior to its receipt by the cloud-based analytics platform.

The cloud-based analytics platform generates the 3D representation based on the authenticated input data. The input data are grouped according to their location information and/or time information. In one embodiment, two 2D images for one location from different angles are used to generate a 3D image. Similarly, a 3D video can be generated. In one embodiment, the target surveillance are is a stadium, people within the stadium can capture images and/or videos within the stadium with their mobile devices and transmit to a cloud-based analytics platform. The cloud-based analytics platform authenticates the images and/or videos for different spots of the stadium from various mobile devices. A 3D representation is constructed based on the images and/or videos. The cloud-based analytics platform performs advanced analytics based on authenticated inputs from various mobile devices and the generated 3D representation, including facial recognition and object detection and etc. The 3D representation can be viewed via a user device, and the 3D representation includes an interactive 3D playback for later investigation or other purposes.

FIG. 1 illustrates a block diagram of an exemplary system 100 consistent with the invention. As shown in FIG. 1, exemplary system 100 may comprises two ICDs 101, 102, a cloud-based analytics platform 103 and a user device 104. The cloud-based analytics platform 103 are constructed and configured in network communication with the two ICDs 101, 102 and the user device 104. The two ICDs each have a visual sensor 105, 106, respectively. The cloud-based analytics platform 103 has a processor 107 and a memory 108. The user device has a display with a user interface 109.

Figure 2:
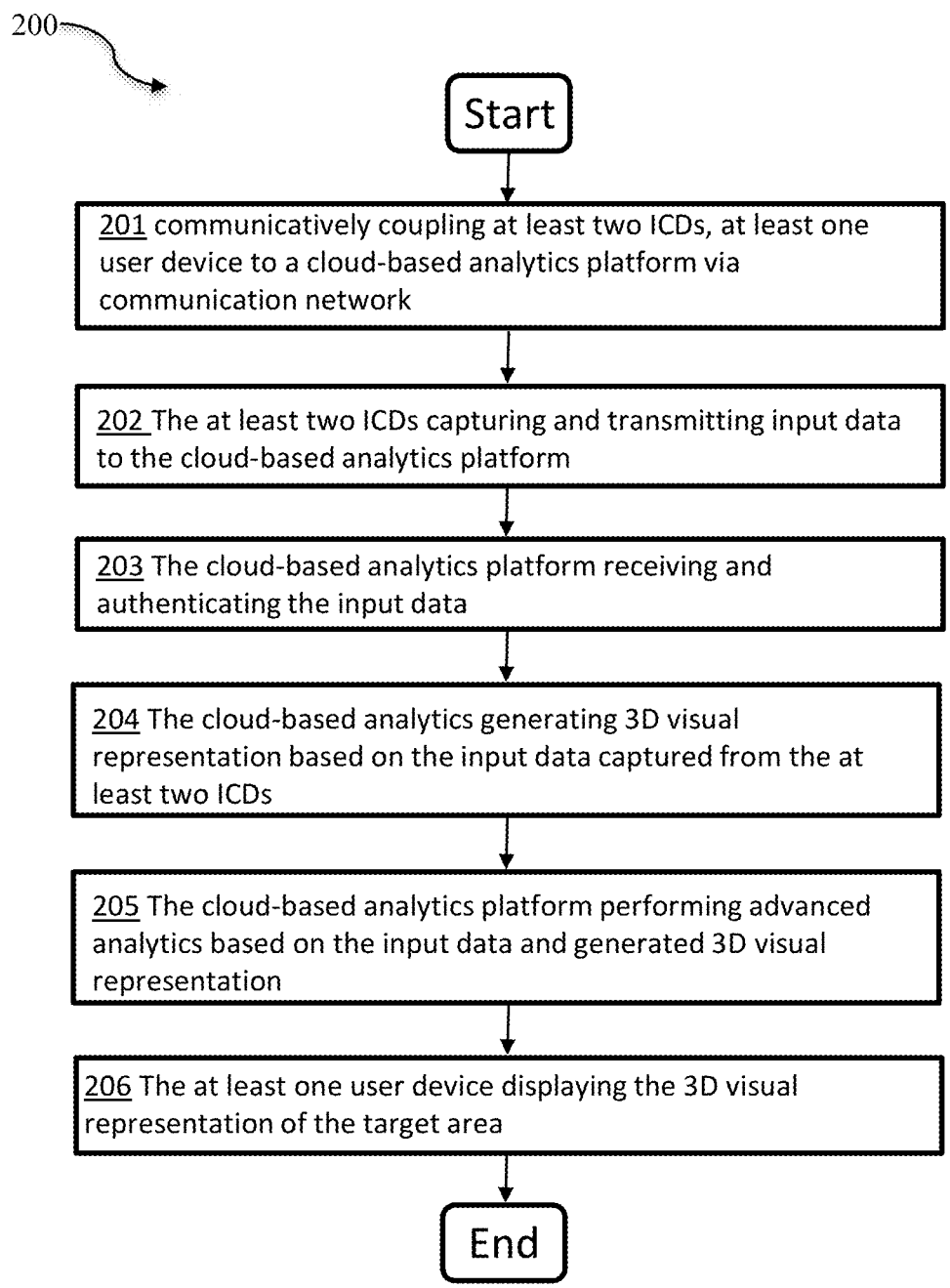
FIG. 2 is a flowchart of a method for providing a cloud-based surveillance system of the present invention.

FIG. 2 is a flowchart 200 illustrating a method for providing a cloud-based surveillance system in the present invention. The method comprises (201) communicatively connecting at least two ICDs and at least one user device having a display with a user interface to a cloud-based analytics platform. The method further comprises (202) the at least two ICDs capturing and transmitting input data to the cloud-based analytics platform. The method further comprises (203) the cloud-based analytics platform receiving and authenticating the input data; (204) generating 3D visual representation based on the input data from the at least two ICDs; and (205) the cloud-based analytics platform performing advanced analytics based on the input data and generated 3D visual representation. The method further comprises (206) the at least one user device displaying the 3D visual representation of the target area via a user interface over a display.

Figure 3:
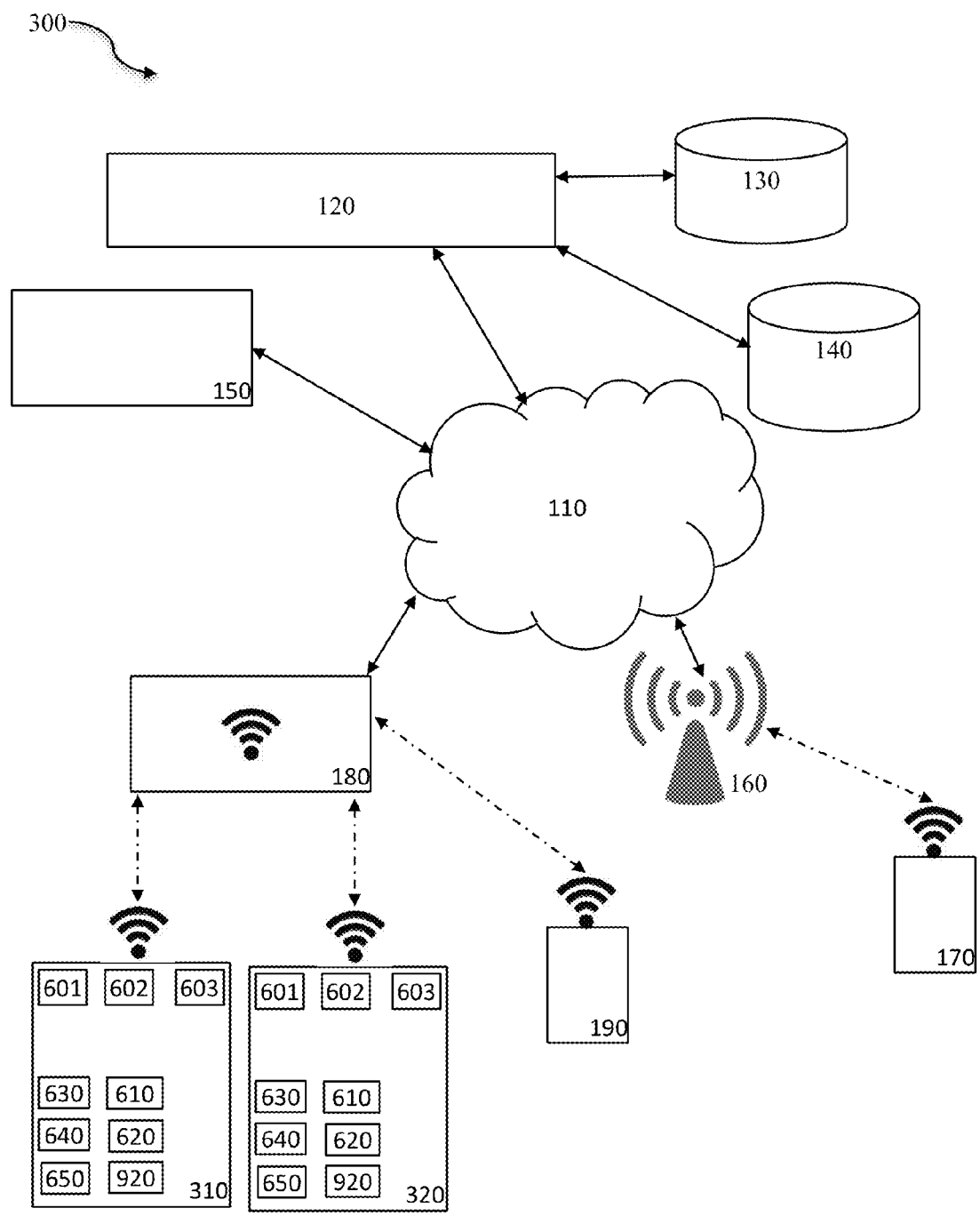
FIG. 3 is a schematic diagram of one embodiment of the invention.
Figure 4:
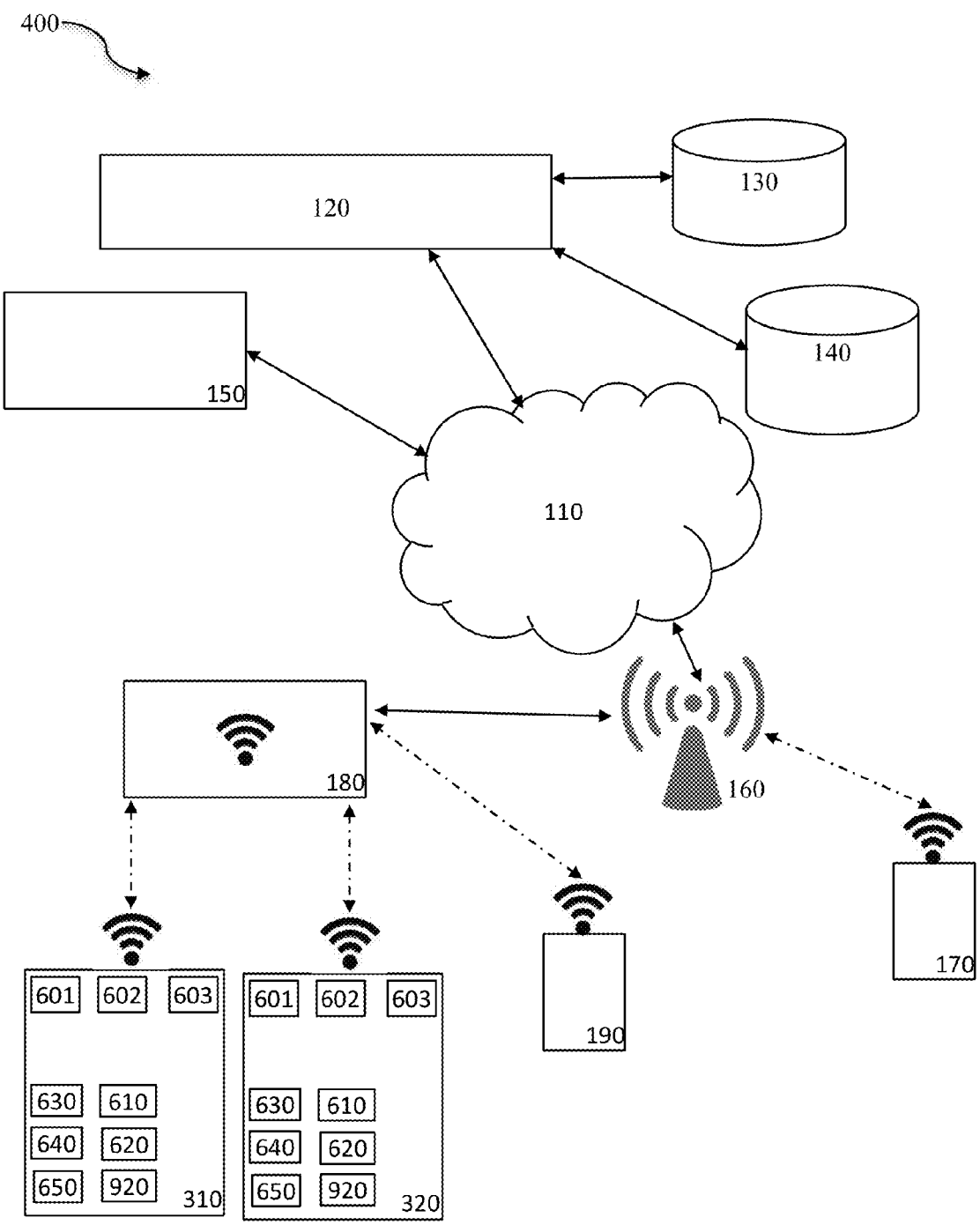
FIG. 4 is a schematic diagram of one embodiment of the invention.
Figure 5:
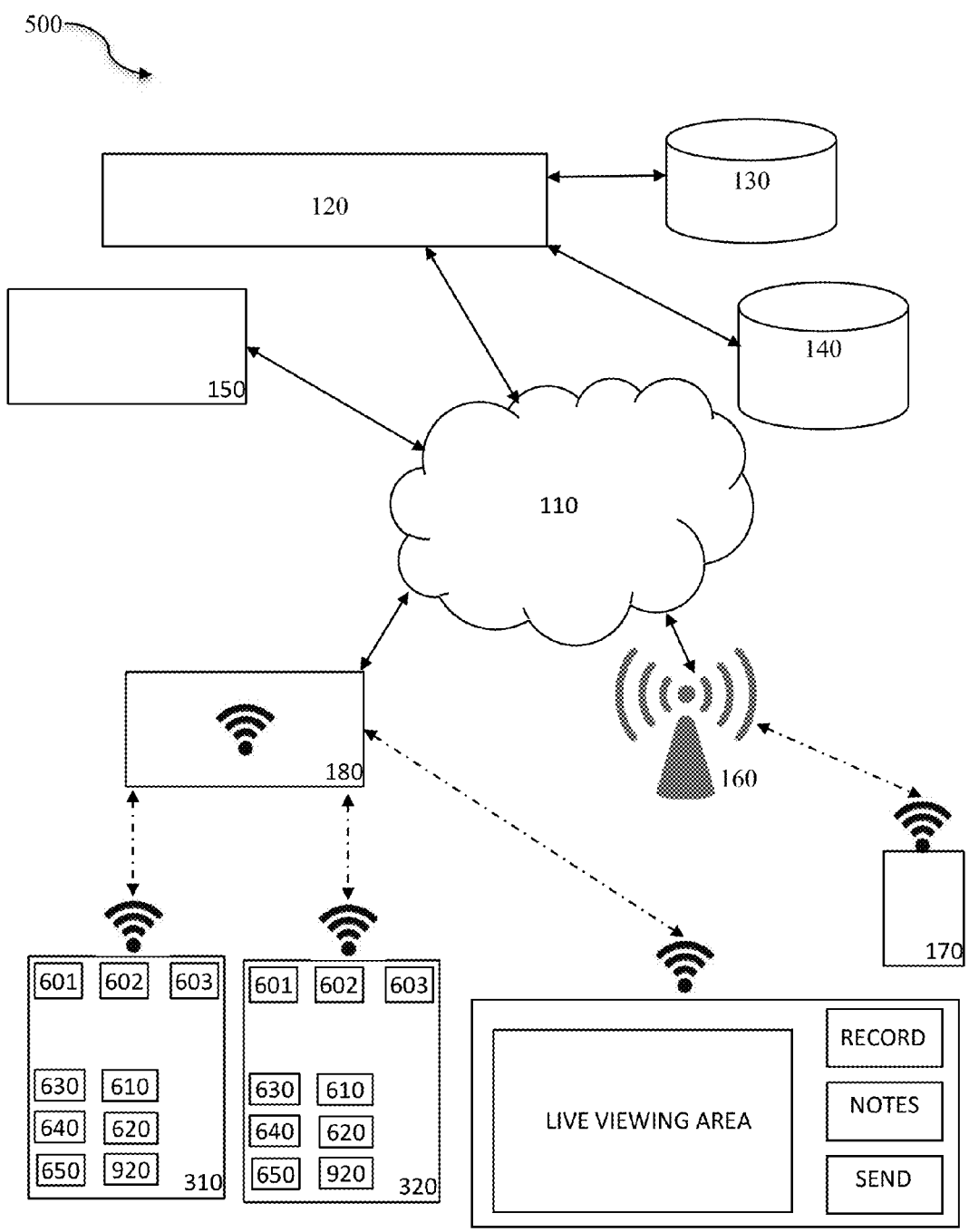
FIG. 5 is a schematic diagram of one embodiment of the invention.

FIGS. 3-5 illustrate schematic diagrams of different embodiments of the present invention; like reference indicators are used throughout the multiple figures for the same or similar elements, as appropriate. FIG. 3 shows one embodiment of a cloud-based video surveillance system 300. The embodiment shows a CPU processor and/or server computer 120 in network-based communication with at least one database 130 and at least one geographically redundant database 140. The server computer 120 is connected to a network 110, a communications (wired and/or wireless) router 180, communications tower 160, and a user device 150 are also connected to the network 110. A user device 170 is connected to the network 110 via the communication tower 160. A user device 190 and two ICDs 310 and 320 are connected to the router 180 in a local area network via Wi-Fi wireless 601, cellular wireless 602, or Bluetooth wireless 603. Each of the two ICDs may include image capture 610, video capture 620, audio capture 630, text and audio note 640, and/or geo-location 650 technologies, each technology capable of collecting data for upload to the network 110 and storage on the databases 130, 140. As the user device 190 may also contain identity technologies 920, such as facial, fingerprint and/or retina recognition, both databases 130, 140 may include identity database for validating fingerprints, facial recognition, and/or retina recognition. User devices 150 and 170, being any computer, tablet, smartphone, or similar device, permits user access to the data, video, image, and audio storage on the cloud.

FIG. 4 illustrates another embodiment 400 of a cloud-based video surveillance system providing for the components shown. A communications router 180 is connected with the network via communication tower 160.

FIG. 5 illustrates another cloud-based video surveillance system 500 with the components shown, including a software application or app on a computing device having a graphic user interface (GUI) providing for a live viewing area on the device and function buttons, virtual buttons (i.e., touch-activated, near-touch-activated, etc.) of record, notes, and send, associated with input capture devices 190.

Figure 6:
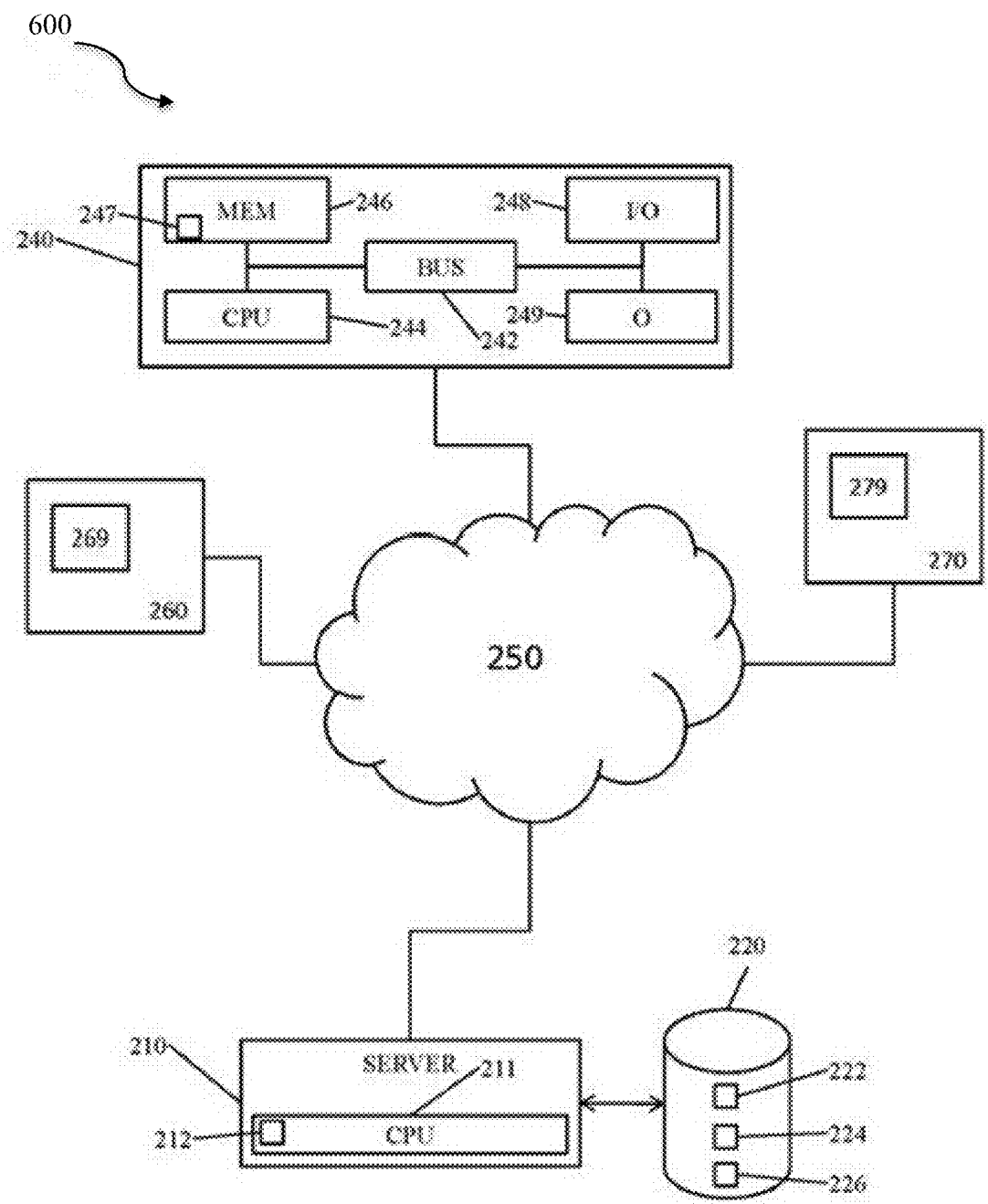
FIG. 6 is a schematic diagram of a cloud-based system of the present invention.

Referring now to FIG. 6, a schematic diagram 600 illustrating a virtualized computing network used in of one embodiment of the invention for automated systems and methods is shown. As illustrated, components of the systems and methods include the following components and subcomponents, all constructed and configured for network-based communication, and further including data processing and storage. As illustrated in FIG. 6, a basic schematic of some of the key components of a financial settlement system according to the present invention are shown. The system 600 comprises a server 210 with a processing unit 211. The server 210 is constructed, configured and coupled to enable communication over a network 250. The server provides for user interconnection with the server over the network using a personal computer (PC) 240 positioned remotely from the server, the personal computer has instructions 247 stored in memory 246. There are other necessary components in the PC 240, for example, a CPU 244, BUS 242, Input/Output ("I/O") port 248, and an Output ("O") port 249. Furthermore, the system is operable for a multiplicity of remote personal computers or terminals 260, 270, having operating systems 269, 279. For example, a client/server architecture is shown. Alternatively, a user may interconnect through the network 250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote distributed user devices. The operating system may be any operating system known in the art that is suitable for network communication as described herein below. Data storage 220 may house an operating system 222, memory 224, and programs 226.

Figure 7:
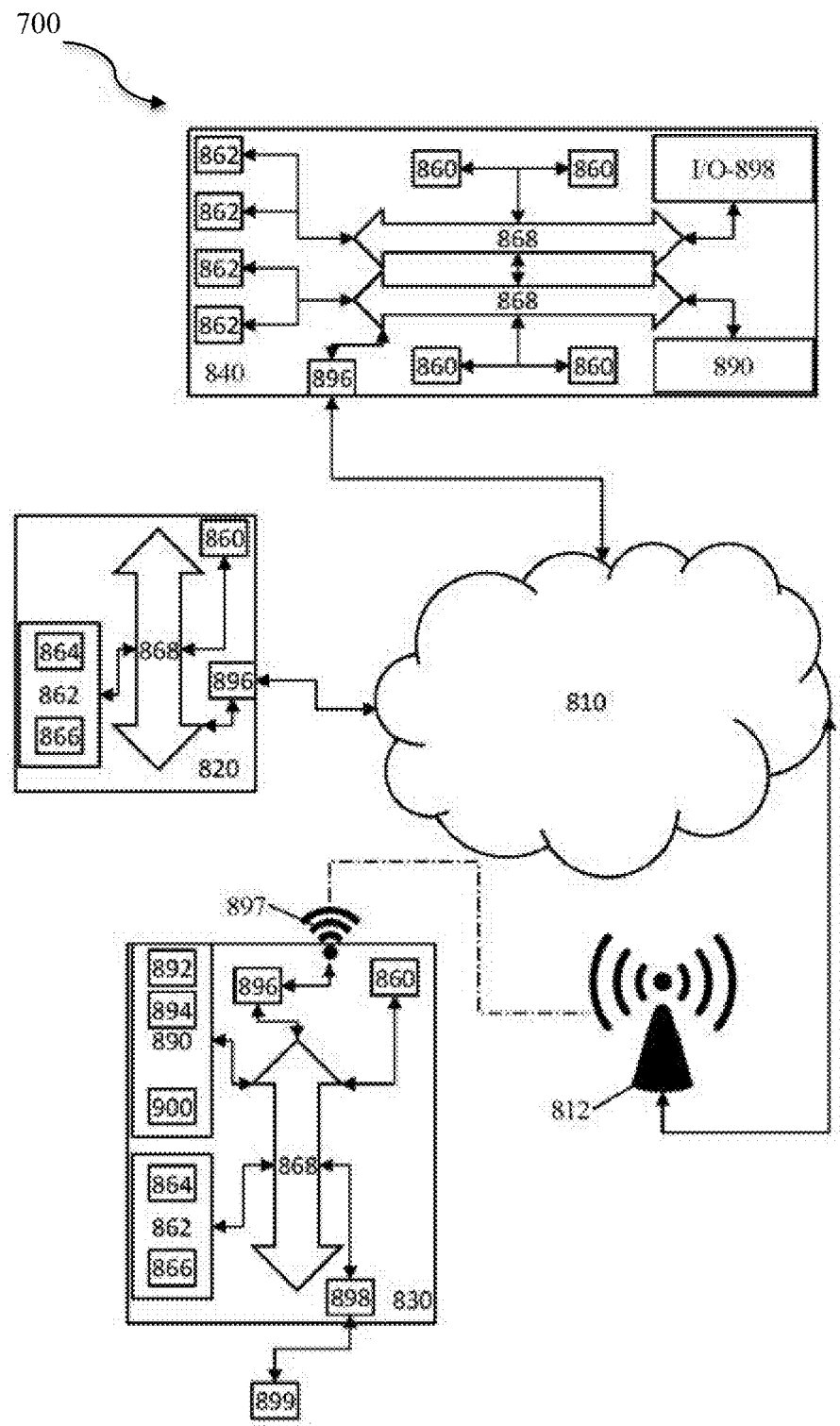
FIG. 7 is another schematic diagram of a cloud-based system of the present invention.

Additionally or alternatively to FIG. 6, FIG. 7 is a schematic diagram of an embodiment of the invention illustrating a computer system, generally described as 700, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 700 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the user device 820 includes components such as a processor 860, a system memory 862 having a random access memory (RAM) 864 and a read-only memory (ROM) 866, and a user bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 700 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 700.

It is also contemplated that the computer system 700 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. By way of example and not limitation, the present invention systems and methods may further include automated web-based searching to identify and analyze similar images and/or videos (or content, individuals, objects, and combinations thereof in the images and/or videos) from social websites or social media postings to associate, link, supplement and/or match with the at least one input authenticated and received by the cloud-based server(s) and corresponding to a surveillance environment, a surveillance event, and/or a surveillance target within a predetermined timeframe. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A cloud-based surveillance system for a target surveillance area, comprising:
at least two input capture devices (ICDs), a cloud-based analytics platform having a processor and a memory, at least one user device having a display with a user interface;
wherein the cloud-based analytics platform is constructed and configured in network-based communication with the at least two ICDs and the at least one user device;
wherein the at least two ICDs have visual sensors and are operable to capture and transmit input data to the cloud-based analytics platform; wherein at least one of the at least two ICDs is a mobile device with a visual sensor;
wherein the cloud-based analytics platform is operable to:
receive and authenticate the input data;
generate 3-Dimensional (3D) visual representation based on input data captured from the at least two ICDs;
perform advanced analytics based on the input data and/or the generated 3D visual representation;
wherein the at least one user device is operable to display the 3D visual representation for the target surveillance area via the user interface.

2. The system of claim 1, wherein the at least two ICDs are selected from the group consisting of security cameras, mobile phones, smart phones, tablets, portable computers, and wearable input capture devices.

3. The system of claim 1, wherein the input data are selected from live streaming video, real-time images and/or audio, previously recorded video, previously captured images and/or audio, and combinations thereof.

4. The system of claim 1, wherein the input data are automatically tagged, combined, grouped, and edited by the cloud-based analytics platform according to the target surveillance area.

5. The system of claim 1, wherein authentication of the input data includes confirming the time for the input data captured by the at least two ICDs.

6. The system of claim 1, wherein authentication of the input data includes confirmation of global positioning system (GPS) location of each of the remote input devices providing inputs and matching the GPS location with that of the target surveillance area.

7. The system of claim 1, wherein authentication of the input data includes confirming that there has been no alteration, editing, and/or modification to the input data prior to its receipt by the cloud-based analytics platform.

8. The system of claim 1, wherein the cloud-based analytics platform is further operable to provide data storage, wherein a time period of storage is selectable on the cloud-based analytics platform.

9. The system of claim 1, wherein the 3D visual representation of the target surveillance area includes 3D playback for a predetermined time period.

10. The system of claim 1, wherein the 3D visual representation of the target surveillance area is interactive.

11. A method for providing cloud-based surveillance for a target surveillance area, comprising:
communicatively connecting at least two input capture devices (ICDs) and at least one user device having a display with a user interface to a cloud-based analytics platform having a processor and a memory via a communication network; wherein each of the at least two ICDs has at least one visual sensor; wherein at least one of the at least two ICDs is a mobile device with a visual sensor;
the at least two ICDs capturing and transmitting input data to the cloud-based analytics platform;
the cloud-based analytics platform receiving and authenticating the input data;
the cloud-based analytics platform generating 3-Dimensional (3D) visual representation based on input data captured from the at least two ICDs;

the cloud-based analytics platform performing advanced analytics based on the input data and/or the generated 3D visual representation;

the at least one user device displaying the 3D visual representation for the target surveillance area via the user interface.

12. The method of claim 11, wherein the at least two ICDs are selected from the group consisting of security cameras, mobile phones, smart phones, tablets, portable computers, and wearable input capture devices.

13. The method of claim 11, wherein the input data are selected from live streaming video, real-time images and/or audio, previously recorded video, previously captured images and/or audio, and combinations thereof.

14. The method of claim 11, further comprising the cloud-based analytics platform tagging, combining, grouping, and editing the input data according to the target surveillance area.

15. The method of claim 11, wherein authenticating the input data comprises confirming the time for the input data captured by the at least two ICDs.

16. The method of claim 11, wherein authenticating the input data comprises confirming a global positioning system (GPS) location of each of the at least two ICDs and matching the GPS location with that of the target surveillance area.

17. The method of claim 11, wherein authenticating the input data comprises confirming that there has been no alteration, editing, and/or modification to the input data prior to its receipt by the cloud-based analytics platform.

18. The method of claim 11, further comprising the cloud-based analytics platform providing data storage, wherein a time period of storage is selectable on the cloud-based analytics platform.

19. The method of claim 11, wherein the 3D visual representation of the target surveillance area includes 3D playback for a predetermined time period.

20. The method of claim 11, wherein the 3D visual representation of the target surveillance area is interactive.

* * * * *